United States Patent [19]

Hall

[11] Patent Number: 5,134,530
[45] Date of Patent: Jul. 28, 1992

[54] AIR STRIPPER FOR IMPROVED SPINDLE SYNC

[75] Inventor: Jonathan E. Hall, Bloomington, Minn.

[73] Assignee: Seagate Technology, Inc., Scotts Valley, Calif.

[21] Appl. No.: 565,646

[22] Filed: Aug. 10, 1990

[51] Int. Cl.$^5$ .................. G11B 5/10; G11B 5/40; G11B 5/60
[52] U.S. Cl. .................. 360/97.03; 360/97.020; 360/103; 360/128
[58] Field of Search .................. 360/97.02, 97.03, 103, 360/106, 128

[56] References Cited

U.S. PATENT DOCUMENTS 4,703,379  10/1987  Bogdanski .................. 360/97.03

Primary Examiner—Robert S. Tupper
Attorney, Agent, or Firm—Kinney & Lange

[57] ABSTRACT

An air stripper for stripping air in a head disk assembly within a magnetic disk drive. The head disk assembly includes a spindle, a magnetic disk, a head arm and the air stripper. The magnetic disk is secured to the spindle for rotation about a central axis and includes a generally planar surface between an inner disk diameter and an outer disk diameter. Rotation of the disk causes a volume of air adjacent the disk surface to flow in the direction of disk rotation. The head arm is positioned proximate the disk surface for actuation across the disk surface through the volume of air. The air stripper is positioned proximate the disk surface and upstream from the head arm with respect to the direction of air flow. The air stripper extends into the volume of air for generally uniformly stripping air such that rotational velocity of the disk is substantially unaffected by actuation of the head arm across the volume of air.

22 Claims, 3 Drawing Sheets

AIR STRIPPER FOR IMPROVED SPINDLE SYNC

BACKGROUND OF THE INVENTION

The present invention relates to a disk drive, such as a magnetic disk drive. In particular, the present invention relates to an air stripper configured for use in the disk drive to reduce synchronous spindle error.

In one typical disk drive, a plurality of disks are secured to a spindle for co-rotation about a central axis. A spindle motor is connected to the spindle for causing rotation of the spindle and the attached disks. The plurality of disks are known as a disk pack. Each disk in the pack includes first and second generally planar recording surfaces. The recording surfaces have a plurality of generally concentric data tracks between an outer disk diameter and an inner disk diameter.

An actuator arm assembly is positioned adjacent the disk pack and includes a plurality of head arms which extend between the disks for actuation across the data tracks. The head arms are movable between an outer position and an inner position, the inner position being closer to the central axis than the outer position. The head arms support an air bearing disk head slider proximate each recording surface for reading from and writing to the data tracks. As the disk rotates, it pulls air between the disk surface and the slider which produces positive pressure on the slider causing it to lift and to fly several microinches above the disk surface.

In large storage systems, several disk drives are connected together to form a storage device having a larger memory capacity and faster read and write cycle rates. For example, eight individual disk drives may be connected together in parallel such that each bit of an eight bit word is written to a separate disk drive. Therefore, an eight bit word may be written in the same period of time as a single bit. Each drive, however, must be synchronized so that each disk pack rotates at exactly the same velocity as the other disk packs. Otherwise, information stored on the disks may be lost.

Each recording surface includes an index position on the data tracks which lies generally on a radial axis of the disk. The index position provides a reference point or mark among individual bit positions on the data tracks. The storage system generates a sync signal that is applied to each drive in the system to synchronize rotation of each disk pack. If the disk packs are not synchronized, one or more bits of the eight bit word may be written to the wrong location or bit position on a particular data track with respect to the index. As a result, this information may be unrecoverable.

Index leading occurs when one disk pack rotates faster than the other disk packs. Index lagging occurs when one disk pack rotates slower than the other disk packs. Variation between rotational velocities of disk packs is known as synchronous spindle error. A disk drive that is capable of maintaining a constant rotational velocity for reducing synchronous spindle error is desired.

Constant rotational velocity is also a critical for maintaining a constant slider flying height. When the rotational velocity increases, the positive pressure beneath the air bearing surface also increases causing the slider to fly at a greater distance from the disk surface. Resolution between individual bit positions on the disk surface is therefore reduced. When the rotational velocity decreases, the positive pressure beneath the air bearing surface also decreases causing the slider to fly closer the disk surface, which increases the risk of a head crash.

Air strippers have been used in magnetic disk drives to improve air filtration. The air strippers include a plurality of stripping members which extend into a volume of air that exists between adjacent disks in the disk pack. The stripping members are oriented generally parallel to the direction of air flow for stripping the air between the disks and directing the air into an air filter. This orientation minimizes power consumption of the spindle motor which is increased by insertion of the air stripper into the air flow. The air strippers have also been used to lessen the windage affects seen by the magnetic disk head sliders.

SUMMARY OF THE INVENTION

The present invention is an air stripper for stripping air in a head disk assembly within a magnetic disk drive. The air stripper of the present invention not only improves air filtration as in the prior art but also reduces variation of disk rotational velocity caused by actuation of a head arm. As a result, disk drive performance is substantially increased.

The head disk assembly includes a spindle, a magnetic disk, and a head arm. The magnetic disk is secured to the spindle for rotation about a central axis. The disk includes a generally planar surface between an inner disk diameter and an outer disk diameter. Rotation of the disk causes a volume of air adjacent the disk surface to flow in the direction of disk rotation. The head arm is positioned proximate the disk surface for actuation across the surface through the volume of air.

The air stripper is positioned proximate the disk surface and upstream from the head arm with respect to the direction of air flow. The air stripper extends into the volume air for generally uniformly stripping air such that rotational velocity is substantially unaffected by actuation of the head arm across the volume of air.

In a disk drive without an air stripper in accordance with the present invention, the head arm diverts or blocks the air flow. It has been found that the amount of air blocked by the head arm is increased when the head arm is positioned at the inner disk diameter and is decreased when positioned at the outer disk diameter. The variation in the amount of air blocked by the head arm is undesirable because as more air is blocked near the inner disk diameter, the disk tends to slow down and as less air is blocked near the outer disk diameter, the disk tends to speed up. The variation in disk rotational velocity caused by actuation of the head arm degrades disk drive performance.

In a disk drive having an air stripper in accordance with the present invention, the amount of air stripped away by the air stripper is generally uniform across the disk surface. Actuation of the head arm has little effect on the air flow such that the disk can maintain a nearly constant rotational velocity irrespective of head arm actuation.

In one embodiment, the head arm is movable between an outer position and an inner position. The air stripper extends into the volume of air from the outer disk diameter toward the inner disk diameter and terminates between the inner position and the inner disk diameter. The stripper is oriented generally along a radial axis of the disk and perpendicular to the direction of air flow.

In another embodiment, the air stripper is configured for use in a magnetic disk drive having a plurality of magnetic disks secured to the spindle for co-rotation about the central axis. For example, in a head disk assembly having nine magnetic disks stacked on the spindle, the air stripper includes a shaft and eight stripping members which extend from the shaft toward the central axis. An actuator arm assembly carries a plurality of head arms which are positioned between disks for actuation across the disk surfaces. The air stripper is positioned upstream from the head arms with respect to air flow generated by rotation of the disks. The stripping members generally uniformly strip air across the disk surfaces such that air flow between the disks is substantially unaffected by actuation of the head arms.

DETAILED DESCRIPTION OF THE PREFERRED EMBODIMENTS

The present invention is an air stripper configured for use in a disk drive such as a magnetic disk drive. The air stripper not only improves air filtration within the drive but also reduces variation in disk rotational velocity caused by actuation of a head arm.

Figure 1:
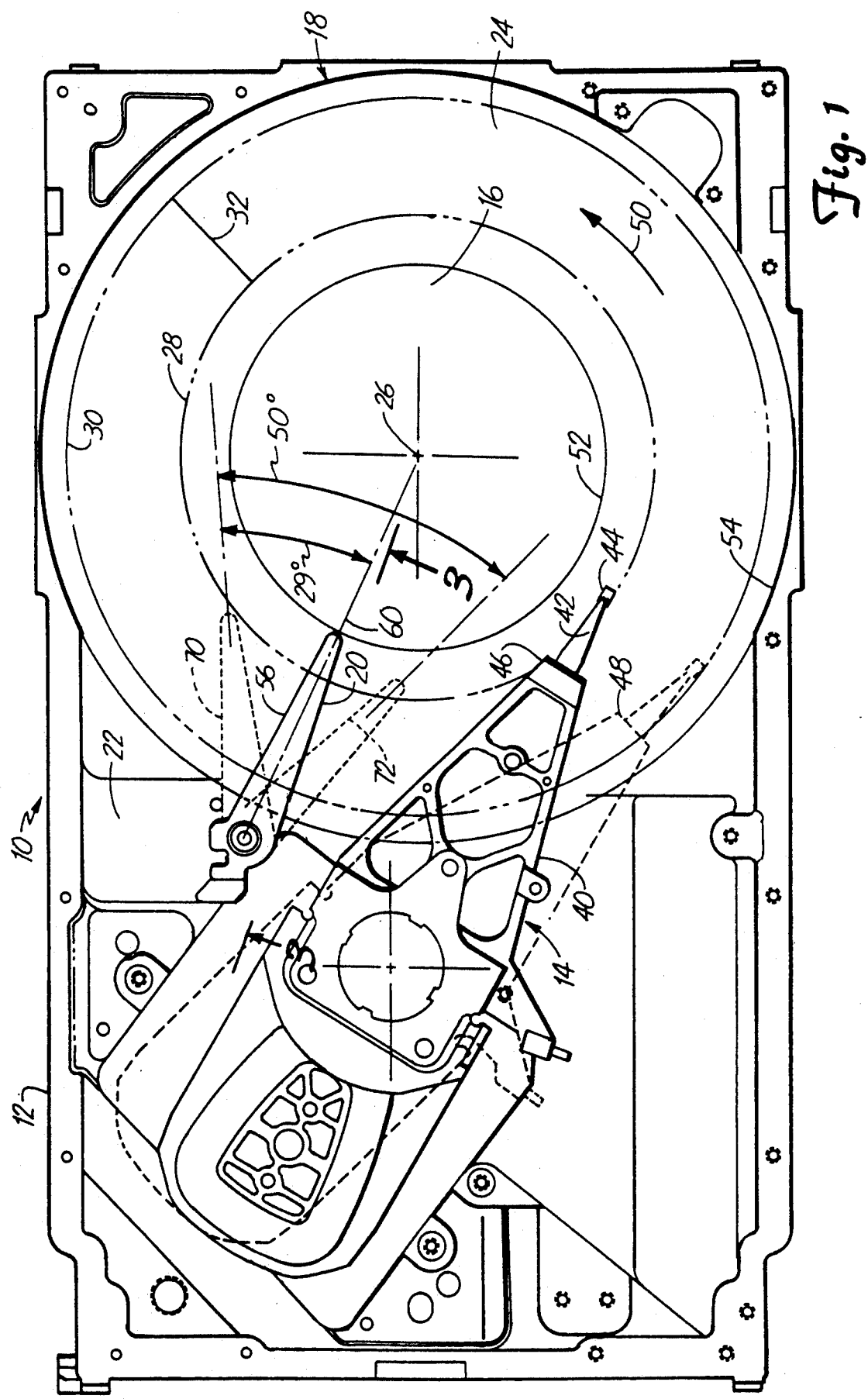
FIG. 1 is a sectional view of a magnetic disk drive having an air stripper in accordance with the present invention.

FIG. 1 is a sectional view of a magnetic disk drive having an air stripper in accordance with the present invention. Magnetic disk drive 10 includes housing 12, actuator arm assembly 14, spindle 16, disk pack 18, air stripper 20 and air filter 22. Disk pack 18 includes a plurality of stacked magnetic disks 24 (only one disk visible), which are secured to spindle 16 for co-rotation about central axis 26. Each disk 24 includes a recording surface with a plurality of generally concentric data tracks (not shown) between inner data track 28 and outer data track 30. The recording surface further includes index 32 which lies generally on a radial axis of disk 24 between inner and outer data tracks 28 and 30. Index 32 provides a reference position with respect to individual bit positions (not shown) on each data track.

Actuator arm assembly 14 includes a plurality of head arms 40 (only one arm visible) which extend into a space between each disk 24 in disk pack 18. Head arm 40 supports load beam 42 and magnetic disk head slider 44 proximate the recording surface on disk 24. Head arm 40 is movable between inner position 46 and outer position 48 (shown in phantom), the inner position being closer to central axis 26 than the outer position.

Slider 44 includes an air bearing surface (not shown) that develops positive pressure as disk 24 rotates and drags air between the disk surface and the air bearing surface. The positive pressure causes the slider to fly several microinches above the disk surface. Slider 44 further includes a magnetic transducer (also not shown) which reads from and writes to the individual bit positions as they pass beneath the transducer. Head arm 40 positions the transducer on slider 44 over selected data tracks between inner and outer data tracks 28 and 30.

Each disk 24 is spaced from the next adjacent disk by approximately ¼ inch, as discussed in more detail below with reference to FIG. 3. This space defines a volume of air between each disk 24. The volume of air tends to flow in the direction of disk rotation, indicated by arrow 50. Head arm 40 extends into the volume of air and diverts or blocks the flow of air when actuation across the data tracks. It has been found that head arm 40 blocks more air when actuated to inner position 46 than when actuated to outer position 48 (shown in phantom). The variation in the amount of air blocked by head arm 40 causes disk pack 18 to speed up (index leading) when the head arm is actuated to outer position 48 and to slow down (index lagging) when the head arm is actuated to inner position 46. The variation in rotational velocity of disk pack 18 caused by actuation of head arm 40 degrades performance of disk drive 10.

In a storage system having a plurality of parallel-connected disk drives, such as drive 10, the rotation of each disk pack must be synchronized with the other disk packs. If not, the information written to a particular disk drive can be written in a wrong location or bit position with respect to the index. As a result, the information can be lost.

Variation in the rotational velocities of parallel-connected disk drives is known as synchronous spindle error. Air stripper 20 substantially reduces synchronous spindle error by reducing the effect on air flow caused by actuation of the head arm 40. Air stripper 20 is positioned upstream from head arm 40 with respect to the air flow generated by rotation of disk 24.

In the preferred embodiment, air stripper 20 is fixed at position 56 which is oriented generally parallel to radial axis 60 of disk 24 and generally perpendicular to the direction of air flow. Air stripper 20 extends into the volume of air from outer disk diameter 54 and terminates near inner disk diameter 52. Air stripper 20 generally uniformly strips air across the entire stroke of head arm 40 between inner position 46 and outer position 48. As a result, the air flow seen by head arm 40 is reduced such that rotational velocity of disk pack 18 is substantially unaffected by actuation of the head arm.

Figure 2:
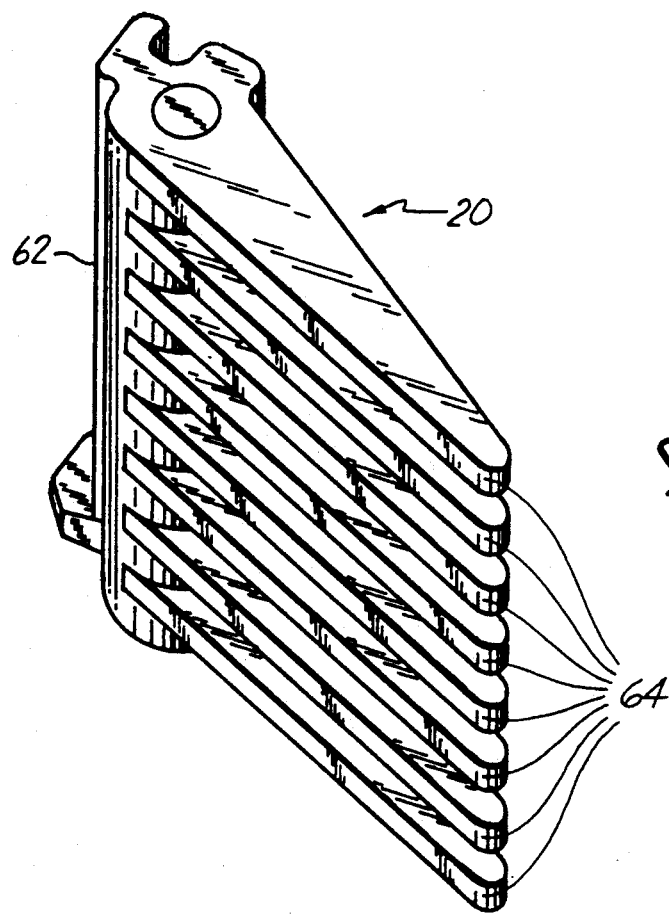
FIG. 2 is a perspective view of the air stripper shown in FIG. 1.

FIG. 2 is a perspective view of air stripper 20. Air stripper 20 includes shaft 62 and a plurality of stripping members 64 attached to shaft 62. Stripping members 64 extend between respective pairs of disks 24 (shown in FIG. 3). In the shown embodiment, air stripper 20 is configured for use with a disk pack having nine disks 24 stacked on spindle 16. In alternative embodiments, air stripper 20 may be configured for use with a disk pack having any number of disks, including one having only a single disk.

Figure 3:
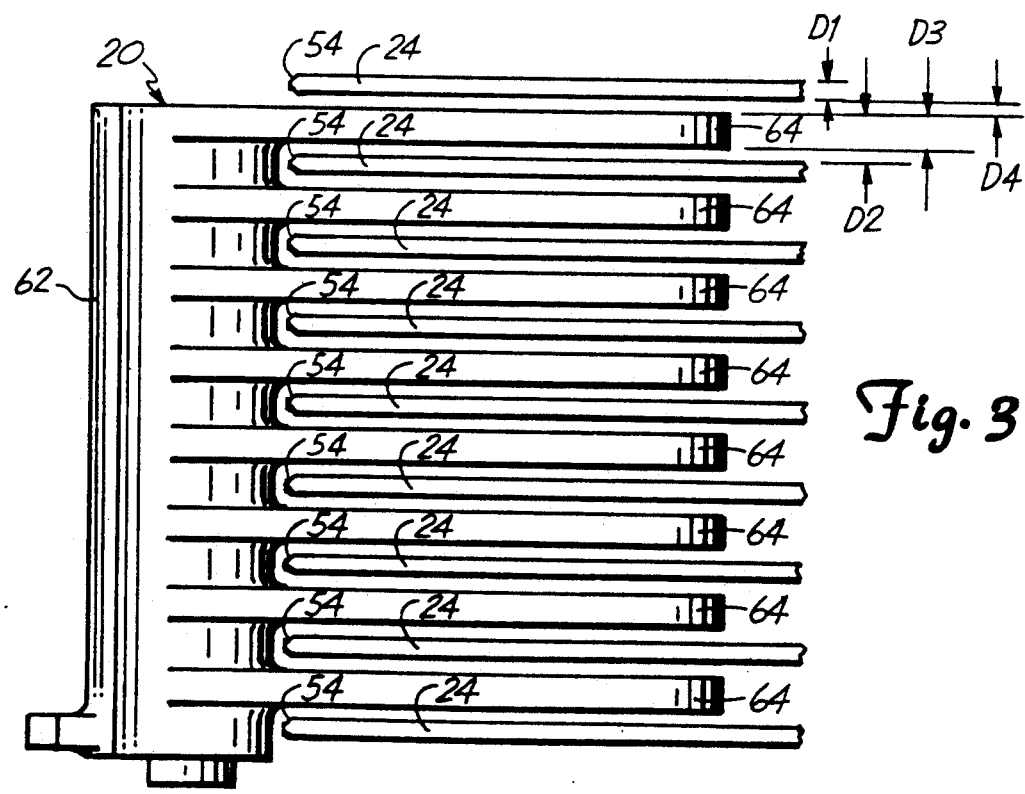
FIG. 3 is a sectional view of the air stripper taken along lines 3—3 of FIG. 1.

FIG. 3 is a sectional view of air stripper 20 taken along lines 3—3 of FIG. 1. Air stripper 20 includes stripping members 64 which extend between disks 24 of disk pack 18 (shown in FIG. 1). Stripping members 64 extend from outer disk diameters 54 toward inner disk diameters 52 (shown in FIG. 1). In the shown embodiment, disks 24 are approximately 0.075 inches thick (distance D1) and are spaced apart by approximately 0.25 inches (distance D2). Stripping members 64 are approximately 0.14 inches thick (distance D3), which leaves a gap of approximately 0.055 inches (distance D4) between stripping members 64 and disks 24. It should be understood that these dimensions may vary depending upon the particular application in which the present invention is used.

Referring back to FIG. 1, air stripper 20 was originally fixed at position 70 (shown in phantom) for improving air filtration of disk drive 10. In position 70, air stripper 20 was oriented generally parallel to the direction of air flow for stripping air from between disks 24 and for directing the air toward air filter 22. This orientation minimized the power consumption of the spindle motor (not shown) while increasing the air flow rate through filter 22.

Figure 4:
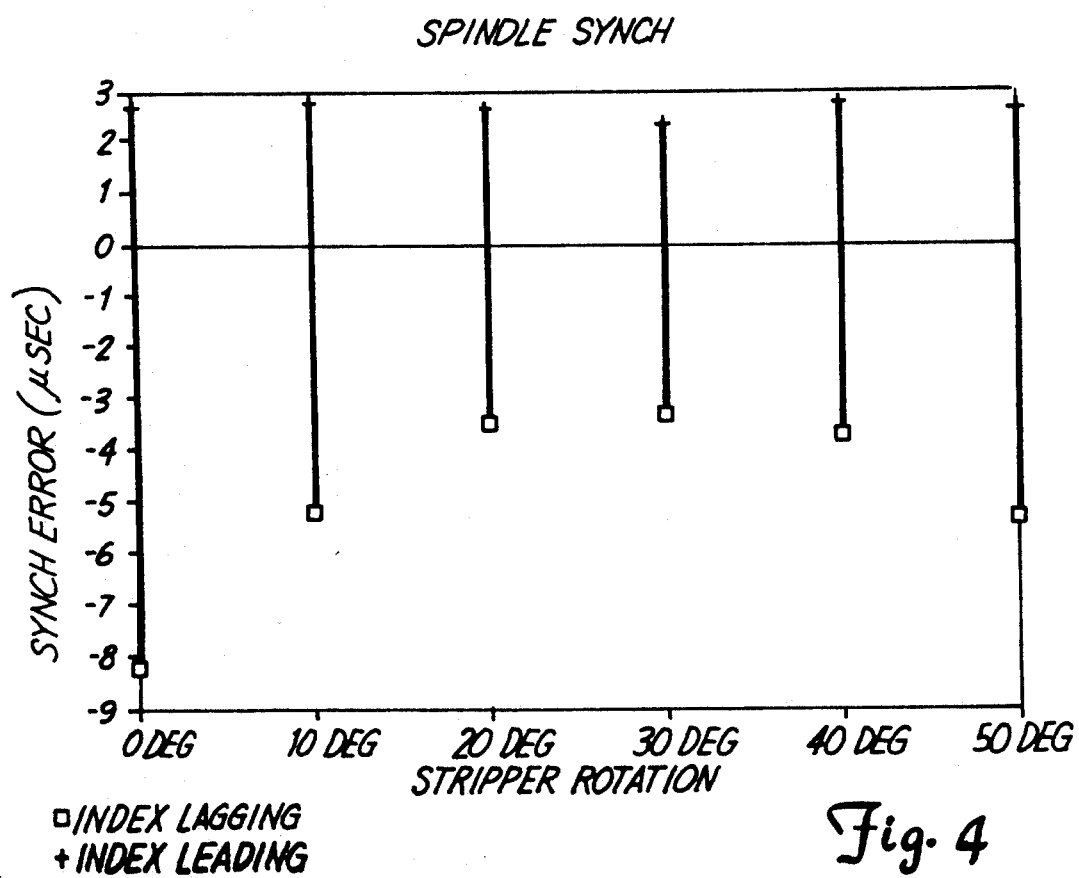
FIG. 4 is a graph of synchronous spindle error as a function of air stripper orientation.

Synchronous spindle error measurements were taken at various air stripper orientations between position 70 (shown in phantom) and position 72 (also shown in phantom). FIG. 4 is a graph of synchronous spindle error as a function of air stripper orientation. Graph entries of average index leading and index lagging values are shown at air stripper rotations of 0°, 10°, 20°, 30°, 40° and 50° with respect to position 70 (original position). Each graph entry represents an average of 5000 samples of variation in rotational velocity from 3600 rpm caused by maximum actuation of head arm 40 between inner position 46 and outer position 48.

When air stripper 20 was oriented at 0° with respect to position 70, the synchronous spindle error ranged from approximately 2.5 microseconds (index leading) to slightly over −8.0 microseconds (index lagging). The 0° orientation resulted in the worst range of synchronous spindle error of all the air stripper orientations measured. With air stripper 20 fixed at position 72, rotated 50° with respect to position 70, the synchronous spindle error ranged from approximately 2.5 microseconds (index leading) to approximately −5.5 microseconds (index lagging). With air stripper 20 fixed at position 56, rotated 30° with respect to position 70, the synchronous spindle error ranged from slightly over 2.0 microseconds (index leading) to slightly over −3.0 microseconds (index lagging). In the embodiment shown in FIG. 1, the 30° orientation minimized gap 74 between spindle 16 and air stripper 20. Thus, the 30° orientation minimized the synchronous spindle error.

Because gap 74 is minimized with air stripper 20 at position 56, all other positions allow more air to pass between the air stripper and spindle 16 which results in a greater windage affect at head arm 40. Therefore, synchronous spindle error is reduced by minimizing the gap between air stripper 20 and spindle 16. This same effect can be achieved by merely shortening or lengthening stripping members 64 of air stripper 20, as opposed to rotating the air stripper. Stripping members 64 preferably terminate somewhere between the smallest disk radius of inner position 46 and spindle 16 (or inner disk diameter 52). Alternatively, Stripping members 64 can terminate between inner data track 28 and inner disk diameter 52.

However, as the amount of air that is blocked by air stripper 20 is increased, the power consumption of the spindle motor which drives spindle 16 is also increased. Therefore, there is a trade off between reduced synchronous spindle error and power consumption. The length and orientation of stripping members 64 must therefore be adjusted depending upon the particular application in which the present invention is to be used.

Figure 5:
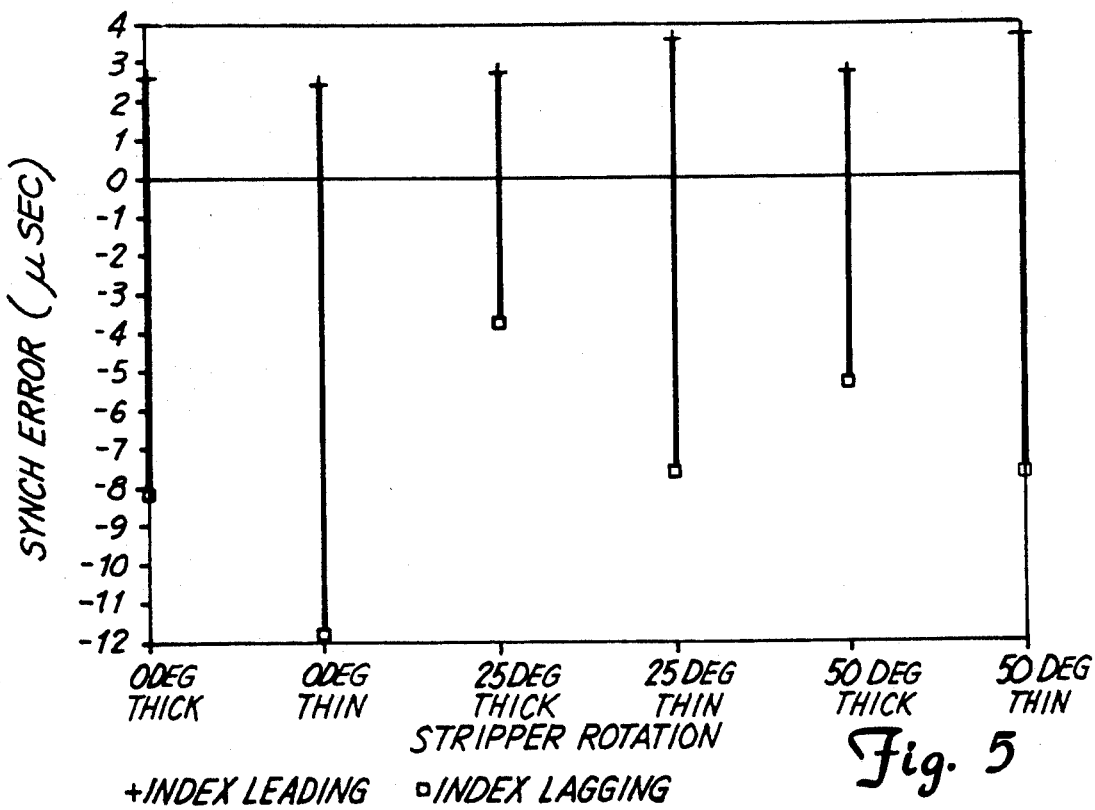
FIG. 5 is a graph of synchronous spindle error as a function of air stripper orientation and air stripper thickness.

Synchronous spindle error is also affected by the thickness of stripping members 64 (distance D3, shown in FIG. 3). FIG. 5 is a graph of synchronous spindle error as a function of air stripper orientation and air stripper thickness. The graph shows the range of synchronous spindle error at 0°, 25° and 50° rotation of air stripper 20 with respect to position 70. The measurements were taken with a relatively thick and a relatively thin stripper profile. At all positions, the relatively thick air stripper profile showed less synchronous spindle error than the relatively thin air stripper profile. Therefore, a thicker air stripper profile is preferred for reducing synchronous spindle error. However, the greater the thickness of air stripper 20, the greater the power consumption of the spindle motor.

The air stripper of the present invention reduces synchronous spindle error by generally uniformly stripping air across the data tracks of a rotating magnetic disk. The air stripper substantially reduces the windage affect seen by the head arm such that the rotational velocity of the disk is substantially unaffected by actuation of the head arm across the data tracks.

Although the present invention has been described with reference to preferred embodiments, workers skilled in the art will recognize that changes may be made in form and detail without departing from the spirit and scope of the invention. For example, the air stripper of the present invention may also be configured for use in an optical disk drive. Further, the shape, orientation, and dimensions of the air stripper may be changed to suit a particular application.

What is claimed is:

1. A head disk assembly for use in a disk drive, the assembly comprising:
   a spindle;
   a disk secured to the spindle for rotation about a central axis and having a generally planar surface between an inner disk diameter and an outer disk diameter, rotation of the disk causing a volume of air adjacent the disk surface to flow in the direction of disk rotation;
   a head arm positioned proximate the disk surface and configured for actuation across a substantial portion of the disk surface from an inner position to an outer position, the head arm having a distal end and a longitudinal axis;
   a load beam attached to the distal end of the head arm and having a longitudinal axis which is aligned in parallel with the longitudinal axis of the head arm;
   a magnetic disk head slider attached to the load beam and positioned proximate to the disk surface; and
   air stripper means positioned proximate the disk surface and upstream from the head arm with respect to the direction of air flow, the air stripper means extending into the volume of air generally adjacent the head arm for shielding the head arm from air flow such that rotational velocity of the disk is substantially unaffected by the actuation of the head arm across the volume of air.

2. The head disk assembly of claim 1 wherein the air stripper means extends into the volume of air from the outer disk diameter toward the inner disk diameter.

3. The head disk assembly of claim 1 wherein the disk surface comprises a plurality of generally concentric data tracks including an inner most data track and wherein the air stripper means terminates between the innermost data track and the inner disk diameter.

4. The head disk assembly of claim 1 wherein the head arm is movable between an outer position and an inner position, the inner position being closer to the central axis than the outer position and wherein the air stripper means terminates between the inner position and the inner disk diameter.

5. The head disk assembly of claim 1 wherein the disk comprises a radial axis and wherein the air stripper means extends toward the axis of rotation and generally parallel to the radial axis.

6. A head disk assembly for use in a disk drive, the assembly comprising:
   a spindle;
   first and second disks secured to the spindle for co-rotation about a central axis, the disks each having an inner and outer diameter and a recording surface with a plurality of data tracks between the inner and outer diameters;
   a head arm positioned between the first and second disks and configured for actuation across a substantial portion of the data tracks, the head arm having a distal end and a longitudinal axis;
   a load beam attached to the distal end of the head arm and having a longitudinal axis which is aligned in parallel with the longitudinal axis of the head arm;
   a magnetic disk head slider attached to the load beam and positioned proximate to the disk surface; and
   air stripper means positioned between the first and second disks and upstream from the head arm with respect to air flow generated by rotation of the disks, the air stripper means generally extending from the outer disk diameter toward the inner disk diameter generally adjacent the head arm for shielding the head arm from air flow to prevent actuation of the head arm across the data tracks from substantially affecting air flow between the disks.

7. The head disk assembly of claim 6 wherein the recording surface further comprises an inner most data track and wherein the air stripper means extends from the outer disk diameter and terminates between the inner most data track and the inner disk diameter.

8. The head disk assembly of claim 6 wherein the air stripper means extends from the outer disk diameter to approximately the inner disk diameter.

9. The head disk assembly of claim 6 wherein the head arm is movable between an outer position and an inner position, the inner position being closer to the central axis than the outer position and wherein the air stripper means terminates between the inner position and the inner disk diameter.

10. The head disk assembly of claim 6 wherein each magnetic disk includes a radial axis and wherein the air stripper means extends generally parallel to the radial axis.

11. The head disk assembly of claim 6 wherein the first and second disks are separated by a gap having a width and wherein the air stripper means has a thickness which is at least abut fifty percent of the gap width.

12. The head disk assembly of claim 11 wherein the thickness of the air stripper means is approximately fifty-six percent of the gap width.

13. A head disk assembly for use in a disk drive, the assembly comprising:
    a spindle;
    first and second disks separated by a gap and secured to the spindle for co-rotation about a central axis, the disks each having an inner and outer diameter and a recording surface with a plurality of data tracks between the inner and outer diameters;
    a head arm positioned between the first and second disks and configured for actuation across a substantial portion of the data tracks; and
    air stripper means extending between the first and second disks from the outer disk diameter toward the inner disk diameter and having a thickness which fills at least about fifty percent of the gap, the air stripper means positioned upstream from the head arm with respect to air flow generated by rotation of the disks for preventing actuation of the head arm across the data tracks from substantially affecting rotational velocity of the disks.

14. The head disk assembly of claim 13 wherein the recording surface further comprises an inner most data track and wherein the air stripper means extends from the outer disk diameter and terminates between the inner most data track and the inner disk diameter.

15. The head disk assembly of claim 13 wherein the air stripper means extends from the outer disk diameter to approximately the inner disk diameter.

16. The head disk assembly of claim 13 wherein the head arm is movable between an outer position and an inner position, the inner position being closer to the central axis than the outer position and wherein the air stripper means terminates between the inner position and the inner disk diameter.

17. The head disk assembly of claim 13 wherein each disk includes a radial axis and wherein the air stripper means extends generally parallel to the radial axis.

18. The head disk assembly of claim 13 wherein the gap has a width and the thickness of the air stripper means is approximately fifty-six percent of the gap width.

19. The head disk assembly of claim 13 and further comprising:
    a load beam having a distal end and a longitudinal axis;
    a magnetic disk head slider attached to the distal end of the load beam and positioned proximate to the recording surface; and
    wherein the head arm includes a longitudinal axis which is aligned with the longitudinal axis of the load beam.

20. A head disk assembly for use in a disk drive, the assembly comprising:
    a spindle;
    first and second disks separated by a gap having a width which defines a volume of air between the disks and secured to the spindle for co-rotation about a central axis, each disk having an inner and outer diameter and a recording surface with a plurality of data tracks between the inner and outer diameters;
    a head arm positioned between the first and second disks and configured for actuation across a substantial portion of the data tracks through the volume of air, the head arm having a distal end and a longitudinal axis;
    a load beam attached to the distal end of the head arm and having a longitudinal axis which is aligned in parallel with the longitudinal axis of the head arm;
    a magnetic disk head slider attached to the load beam and positioned proximate to the disk surface; and
    an air stripper arm which extends inwardly toward the central axis generally adjacent the head arm, the air stripper arm having a thickness which is at least about fifty percent of the gap width.

21. The head disk assembly of claim 20 wherein the air stripper arm generally extends inwardly in a radial direction toward the central axis.

22. The head disk assembly of claim 20 wherein the thickness of the air stripper arm is approximately fifty-six percent of the gap width.

* * * * *

UNITED STATES PATENT AND TRADEMARK OFFICE
CERTIFICATE OF CORRECTION

PATENT NO. : 5,134,530
DATED : July 28, 1992
INVENTOR(S) : JONATHAN E. HALL

It is certified that error appears in the above-identified patent and that said Letters Patent is hereby corrected as shown below:

Col. 7, line 51, delete "abut", insert "about"

Signed and Sealed this

Twenty-fourth Day of August, 1993

Attest:

BRUCE LEHMAN

*Attesting Officer*  *Commissioner of Patents and Trademarks*